(12) United States Patent
Fukumura et al.

(10) Patent No.: US 11,863,093 B2
(45) Date of Patent: Jan. 2, 2024

(54) MOTOR CONTROL DEVICE AND MOTOR CONTROL METHOD

(71) Applicant: Nidec Corporation, Kyoto (JP)

(72) Inventors: Tomohiro Fukumura, Kyoto (JP); Linfeng Lan, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 95 days.

(21) Appl. No.: 17/761,657

(22) PCT Filed: Aug. 20, 2020

(86) PCT No.: PCT/JP2020/031484
§ 371 (c)(1),
(2) Date: Mar. 18, 2022

(87) PCT Pub. No.: WO2021/054033
PCT Pub. Date: Mar. 25, 2021

(65) Prior Publication Data
US 2022/0329190 A1    Oct. 13, 2022

(30) Foreign Application Priority Data
Sep. 20, 2019    (JP) ................................. 2019-171375

(51) Int. Cl.
| | |
|---|---|
| *H02P 1/04* | (2006.01) |
| *H02P 5/00* | (2016.01) |
| *H02P 7/00* | (2016.01) |
| *H02P 23/14* | (2006.01) |
| *H02P 29/66* | (2016.01) |

(Continued)

(52) U.S. Cl.
CPC .............. *H02P 23/14* (2013.01); *H02P 29/66* (2016.02); *B60L 15/20* (2013.01); *B62D 5/046* (2013.01)

(58) Field of Classification Search
CPC ................................ H02P 23/14; H02P 29/66
USPC ......................................................... 318/445
See application file for complete search history.

(56) References Cited

U.S. PATENT DOCUMENTS

| | | | |
|---|---|---|---|
| 6,445,987 B1 * | 9/2002 | Kurishige | ............ B62D 5/0466 |
| | | | 701/84 |
| 6,705,286 B1 * | 3/2004 | Light | .................... F02D 11/105 |
| | | | 701/115 |
| 2007/0290633 A1 | 12/2007 | Atarashi et al. | |

(Continued)

FOREIGN PATENT DOCUMENTS

| | | |
|---|---|---|
| CN | 108718167 A | 10/2018 |
| JP | 2005-218215 A | 8/2005 |

(Continued)

OTHER PUBLICATIONS

Official Communication issued in International Patent Application No. PCT/JP2020/031484, dated Nov. 2, 2020.

(Continued)

*Primary Examiner* — Erick D Glass
(74) *Attorney, Agent, or Firm* — Keating & Bennett, LLP

(57) ABSTRACT

A first torque estimator determines a first torque estimation value according to a cross product method, and a second torque estimator determines a second torque estimation value according to an energy method. A torque weight adjuster adjusts, using a weighting coefficient calculated in accordance with a predetermined condition, weightings respectively applied to these two types of torque estimation values, and outputs a torque estimation value.

16 Claims, 5 Drawing Sheets

(51) Int. Cl.
    *B60L 15/20*         (2006.01)
    *B62D 5/04*          (2006.01)

(56) References Cited

U.S. PATENT DOCUMENTS

| | | | |
|---|---|---|---|
| 2012/0007528 A1 | | 1/2012 | Nakatsugawa et al. |
| 2018/0172090 A1* | | 6/2018 | Kim ........................ F16D 48/00 |
| 2019/0210603 A1* | | 7/2019 | Xu ....................... B60W 10/184 |
| 2019/0229665 A1 | | 7/2019 | Kobayashi |

FOREIGN PATENT DOCUMENTS

| | | | |
|---|---|---|---|
| JP | 2007-325397 A | 12/2007 | |
| JP | 2016-127668 A | 7/2016 | |
| JP | 2016-187250 A | 10/2016 | |
| JP | 2019-129573 A | 8/2019 | |
| WO | 2010/116815 A1 | 10/2010 | |

OTHER PUBLICATIONS

Hida et al., "New Torque Estimation Method Considering Spatial Harmonics and Torque Ripple Reduction in Permanent Magnet Synchronous Motors", The Institute of Electrical Engineers of Japan, vol. 130, No. 9, 2010, 9 pages.

\* cited by examiner

MOTOR CONTROL DEVICE AND MOTOR CONTROL METHOD

CROSS-REFERENCE TO RELATED APPLICATIONS

This is a U.S. national stage of application No. PCT/JP2020/031484, filed on Aug. 20, 2020, with priority under 35 U.S.C. § 119(a) and 35 U.S.C. § 365(b) being claimed from Japanese Patent Application No. 2019-171375, filed on Sep. 20, 2019, the entire disclosures of which are hereby incorporated herein by reference.

FIELD OF THE INVENTION

The present disclosure relates to a motor control device and a motor control method to drive and control an electric motor.

BACKGROUND

A motor torque estimation has been conventionally performed in controlling an output torque from an electric motor used in various fields of, for example, industrial devices, home electrical appliances, electric vehicles, and hybrid vehicles. A method for such a motor torque estimation can be roughly classified into a cross product method and an energy method.

The cross product method is a method for estimating a motor torque based on a product of a magnetic flux and a current. For example, it is known to estimate a motor torque $\hat{T}$ (T hat) based on a product of magnetic fluxes ($\varphi d$, $\varphi q$) and currents (Idc, Iqc) as shown in Expression (1).

[Mathematical Expression 1]

$$\hat{T} = \varphi_d I_{qc} + \varphi_q I_{dc} \qquad (1)$$

An electric motor control device is known that uses a method (energy method) for estimating a torque by dividing a motor output (difference between $P_{in}$ and $P_{loss}$) by a motor rotational speed ($\omega m$) as shown in Expression (2). In Expression (2), $P_{in}$ represents motor input power, and $P_{loss}$ represents a motor loss.

[Mathematical Expression 2]

$$\hat{T} = \frac{P_{in} - P_{loss}}{\omega_m} \qquad (2)$$

Meanwhile, a torque estimation method is proposed that is a combination of the cross product method with the energy method.

According to the proposed torque estimation method, the combined use of the energy method and the cross product method is further capable of estimating an instantaneous torque ripple, but assumption is made that a current and a magnetic flux have a linear relationship although the cross product method is used. In addition, the proposed torque estimation method has a problem that features of each of the energy method and the cross product method are not utilized because an arithmetic mean of torque estimation values is merely taken according to two methods, that is, the energy method and the cross product method.

SUMMARY

A first example embodiment of the present disclosure provides a motor control device to drive an electric motor. The motor control device includes a first torque estimator to determine a first torque estimation value based on at least a coil interlinkage flux and a motor current, a second torque estimator to determine a second torque estimation value based on at least motor input power and a motor rotational speed, and a weighting adjuster to adjust, in accordance with a predetermined condition, weightings respectively applied to the first torque estimation value and the second torque estimation value, and to calculate a torque estimation value of the electric motor.

A second example embodiment of the present disclosure provides an electric power steering device to assist a driver in steering a vehicle or the like. The electric power steering device includes an electric motor to provide steering assistance to the driver, and a driver to drive and control the electric motor by the motor control device according to the first example embodiment.

A third example embodiment of the present disclosure provides an electric power steering system including the motor control device for electric power steering according to the second example embodiment.

A fourth example embodiment of the present disclosure provides an electric vehicle including an electric motor as a power source, the electric vehicle including a driver to drive and control the electric motor by the motor control device according to the first example embodiment.

A fifth example embodiment of the present disclosure provides a hybrid vehicle including an electric motor and an internal combustion engine as power sources, the hybrid vehicle including a driver to drive and control the electric motor by the motor control device according to the first example embodiment.

A sixth example embodiment of the present disclosure provides a motor control method to drive an electric motor. The motor control method including determining a first torque estimation value based on at least a coil interlinkage flux and a motor current, determining a second torque estimation value based on at least motor input power and a motor rotational speed, and adjusting, in accordance with a predetermined condition, weightings respectively applied to the first torque estimation value and the second torque estimation value, and calculating a torque estimation value of the electric motor.

The above and other elements, features, steps, characteristics and advantages of the present disclosure will become more apparent from the following detailed description of the example embodiments with reference to the attached drawings.

DETAILED DESCRIPTION

Figure 1:
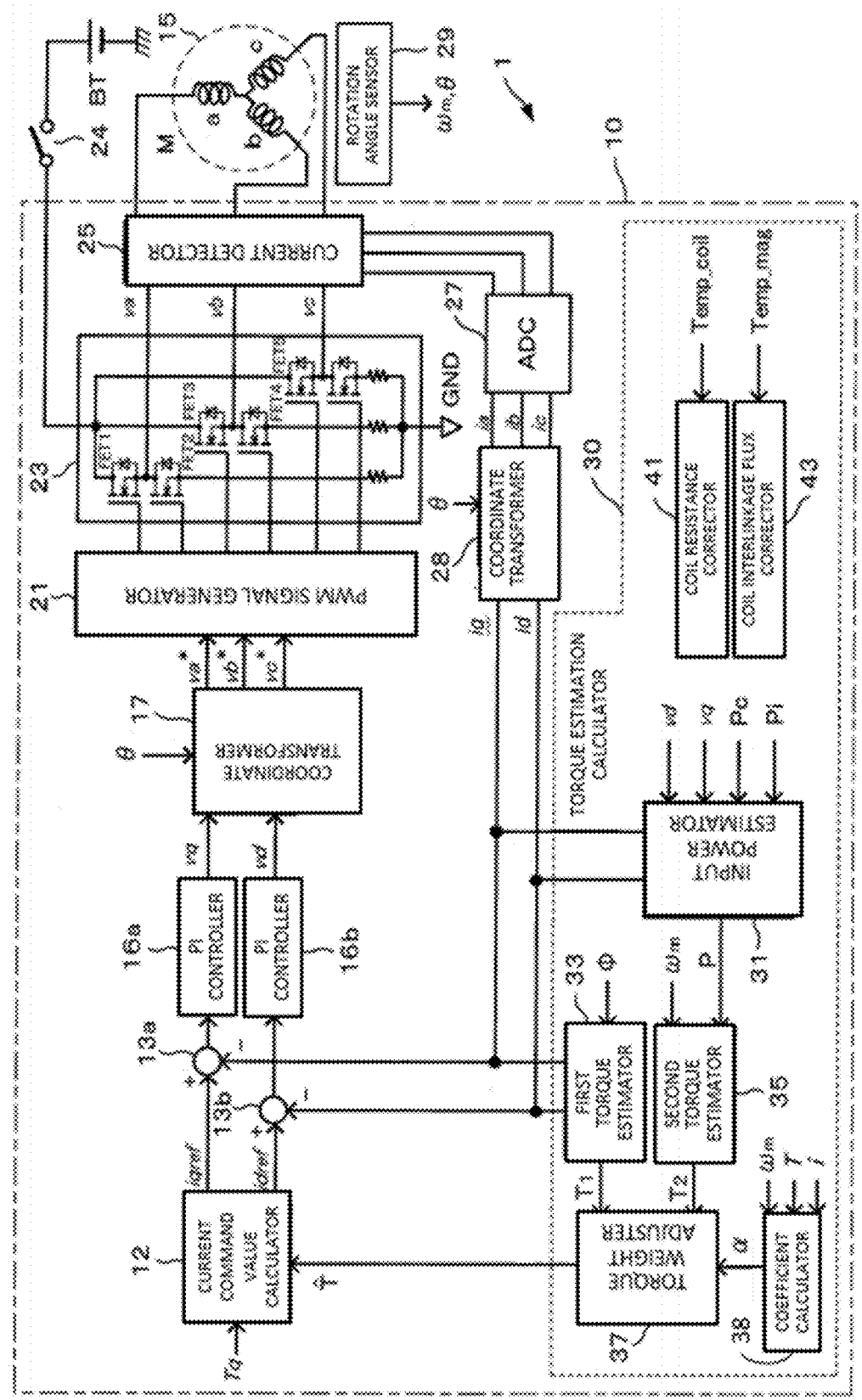
FIG. 1 is a block diagram illustrating an overall configuration of a motor control device according to an example embodiment of the present disclosure.

Example embodiments according to the present disclosure will be described in detail below with reference to the accompanying drawings. FIG. 1 is a block diagram illustrating an overall configuration of motor control devices according to the example embodiments of the present disclosure.

A motor control device 1 illustrated in FIG. 1 includes a motor controller 10 that is configured or programmed to function as a drive controller of an electric motor 15. The electric motor 15 is, for example, a three-phase brushless DC motor. The motor controller 10 is configured or programmed to include a torque estimation calculator 30, a current command value calculator 12, a PWM signal generator 21, an external battery BT, an inverter 23, and the like.

The inverter 23 is a motor drive circuit that generates alternating current from power supplied from the battery BT through a power supply relay 24. The alternating current is used for driving the electric motor 15. The power supply relay 24 is configured to be able to cut off power supplied from the battery BT, and further can be configured as a semiconductor relay.

The PWM signal generator 21 generates, based on voltage command values to be described later, ON/OFF control signals (PWM signals) for a plurality of semiconductor switching elements (FET1 to FET6) constituting the inverter 23. The semiconductor switching elements correspond to respective phases (phase a, phase b, phase c) of the electric motor 15.

The switching element (FET) is also called a power element. Examples of the switching element to be used include a metal-oxide semiconductor field-effect transistor (MOSFET), an insulated gate bipolar transistor (IGBT), and the like.

The inverter 23 serving as the motor drive circuit supplies motor drive currents to the electric motor 15. The motor drive currents are detected by a current detector 25 including current sensors (not illustrated) disposed for the respective phases. For example, the current detector 25 detects direct current flowing through a shunt resistor for motor drive current detection, using an amplifier circuit including an operational amplifier and the like.

The current detector 25 provides output signals (current detection signals) to an analog-to-digital converter (ADC) 27. The ADC 27 converts analog current values into digital values by an A/D conversion function to thereby obtain three-phase currents ia, ib, and ic. The three-phase currents ia, ib, and ic are input to a coordinate transformer 28.

The coordinate transformer 28 has a function of transformation from three phases to two phases, and calculates a current id on a d-axis and a current iq on a q-axis based on a rotation angle θ detected by a rotation angle sensor 29 and the three-phase currents ia, ib, and ic. That is, the coordinate transformer 28 calculates a d-axis current and a q-axis current based on an actual current.

The torque estimation calculator 30 includes a first torque estimator 33, a second torque estimator 35, a torque weight adjuster (weighting adjuster) 37, and the like. The torque weight adjuster 37 adjusts weightings respectively applied to a first torque estimation value output from the first torque estimator 33 and a second torque estimation value output from the second torque estimator 35.

The torque weight adjuster 37 adjusts a torque estimation value $\hat{T}$ (T hat) of the electric motor 15 according to Expression (3) below. In Expression (3), $T_1$ represents the first torque estimation value, $T_2$ represents the second torque estimation value, and α (0≤α≤1) represents a weighting adjustment coefficient.

[Mathematical Expression 3]

$$\hat{T} = (1-\alpha)T_1 + \alpha T_2 \quad (3)$$

The first torque estimation value $T_1$ is expressed by Expression (4) below. Expression (4) is an arithmetic expression according to the cross product method.

$$T_1 = N_{pp}\{\Phi i_q + (L_d - L_q)i_d i_q\} \quad (4)$$

In Expression (4), $N_{pp}$ represents the number of motor pole pairs, $L_d$ and $L_q$ represent motor inductances in a rotation vector coordinate system, Φ represents a coil interlinkage flux, and $i_d$ and $i_q$ represent motor currents.

The second torque estimation value $T_2$ is expressed by Expression (5) below. Expression (5) is an arithmetic expression according to an energy method, P represents motor input power, and $\omega_m$ represents a motor rotational speed.

$$T_2 = P/\omega_m \quad (5)$$

The motor input power P is estimated by an input power estimator 31 using Expression (6) below.

$$P = v_d i_d + v_q i_q - P_c - P_i \quad (6)$$

In Expression (6), $v_d$ and $v_q$ represent voltages applied to the motor in the rotation vector coordinate system, $P_c$ represents a copper loss, and $P_i$ represents a loss (such as iron loss or shaft loss) other than the copper loss.

The copper loss $P_c$ is estimated by a copper loss estimator, not illustrated, using Expression (7) below.

$$P_c = R(i_d^2 + i_q^2) \quad (7)$$

In Expression (7), R represents a coil resistance value of the electric motor 15. Thus, accuracy of the motor torque estimation can be increased based on a result of estimating the motor input power and the copper loss.

Note that, for the coil resistance value of the electric motor 15, a means for detecting a coil temperature may be provided, and a coil resistance corrector 41 may correct a coil resistance using a coil temperature (Temp_coil) derived from the means for detecting a coil temperature. The coil resistance is thus corrected based on the coil temperature of the motor, and therefore, the accuracy of the motor torque estimation can be increased.

Furthermore, a means for detecting a magnet temperature of a magnet may be provided in a rotor of the electric motor 15, and a coil interlinkage flux corrector 43 may correct a coil interlinkage flux of the electric motor 15 using a magnet temperature (Temp_mag) derived from the means for detecting a magnet temperature. The coil interlinkage flux is thus corrected based on the magnet temperature of the motor, and therefore, the accuracy of the motor torque estimation can be increased.

A description will now be given of a weighting adjustment coefficient in the torque estimation of the motor control device according to the present example embodiment. In Expression (3) (also referred to as a torque estimation equation) described above, the weighting adjustment coefficient α is a coefficient for adjusting a proportion between the first torque estimation value $T_1$ and the second torque estimation value $T_2$, and is also called a torque weight.

Based on a predetermined input, a coefficient calculator 38 calculates the weighting adjustment coefficient α according to some methods. For example, as a first method, as shown in Expression (8) below, a weighting coefficient α is calculated based on a ratio (proportion) of an output of the electric motor 15.

[Mathematical Expression 4]

$$\alpha = \frac{\hat{T}\omega_m}{T_{max}\omega_{m\_max}} \quad (8)$$

In Expression (8), $T_{max}$ represents a maximum value of a motor output, and $W_{m\_max}$ represents a maximum value of the motor rotational speed.

In Expression (3) for determining the torque estimation value $\hat{T}$ (T hat), according to Expression (8), the torque weight adjuster 37 adjusts the weightings respectively applied to the first torque estimation value $T_1$ and the second torque estimation value $T_2$, using the weighting coefficient α calculated based on output power of the electric motor 15. Thus, a motor torque estimation can be performed in an entire region from a low-speed region to a high-speed region.

As a second method, as shown in Expression (9) below, the coefficient calculator 38 calculates a weighting coefficient α based on a ratio of a rotational speed of the electric motor 15.

[Mathematical Expression 5]

$$\alpha = \frac{\omega_m}{\omega_{m\_max}} \quad (9)$$

In Expression (3) for determining the torque estimation value $\hat{T}$ (T hat), the torque weight adjuster 37 adjusts the weightings respectively applied to the first torque estimation value $T_1$ and the second torque estimation value $T_2$, using the weighting coefficient α calculated based on the rotational speed of the electric motor 15.

According to Expression (3), at a low motor rotational speed, the weighting coefficient α is adjusted to be small and a torque estimation utilizing the features of the cross product method can be performed, and at a high motor rotational speed, the weighting coefficient α is adjusted to be large and a torque estimation utilizing the features of the energy method can be performed.

Thus, the weightings are adjusted using the weighting coefficient α calculated based on the rotational speed of the electric motor, and therefore, the motor torque estimation can be performed in the entire region from the low-speed region to the high-speed region.

In a third method for calculating the weighting adjustment coefficient α, using Expression (10) below, a weighting coefficient α is calculated based on a ratio of a current flowing through a coil of the electric motor 15. In Expression (10), $i_{max}$ represents a maximum value of a motor current.

[Mathematical Expression 6]

$$\alpha = \frac{i}{i_{max}} \quad (10)$$

The torque weight adjuster 37 calculates a weighting coefficient α based on the current flowing through the coil of the electric motor 15, and adjusts, using the resultant weighting coefficient α, weightings respectively applied to the first torque estimation value $T_1$ and the second torque estimation value $T_2$. The weightings are adjusted using the weighting coefficient α based on the current flowing through the coil of the electric motor, and therefore, the motor torque estimation can be performed in the entire region from the low-speed region to the high-speed region.

The current command value calculator 12 determines a difference (torque deviation) between instruction torque Tq which is externally input and the torque estimation value $\hat{T}$ (T hat) adjusted by the torque weight adjuster 37, and performs proportional-plus-integral control (PI control) on the resultant difference. The current command value calculator 12 performs predetermined current command calculation based on a torque value obtained by the PI control to determine a d-axis command current $id_{ref}$ which is a magnetic field component and a q-axis command current $iq_{ref}$ which is a torque component.

A subtractor 13a calculates a difference (denoted as Dq) between the q-axis command current $iq_{ref}$ and the q-axis current iq. A subtractor 13b calculates a difference (denoted as Dd) between the d-axis command current $id_{ref}$ and the d-axis current id.

The difference Dq is input to a PI controller 16a, and the difference Dd is input to a PI controller 16b. The PI controller 16a performs PI (proportional-plus-integral) control for converging Dq to zero, and calculates a q-axis voltage command value vq that is a command value of a q-axis voltage. The PI controller 16b performs PI (proportional-plus-integral) control for converging Dd to zero, and thereby calculates a d-axis voltage command value vd that is a command value of a d-axis voltage.

Thus, the PI controllers 16a and 16b serving as current controllers determine the d-axis and q-axis voltage command values so as to set a difference between the d-axis and q-axis current command values and a detected current value to zero. A coordinate transformer 17 calculates voltages applied to the motor, based on the d-axis and q-axis voltage command values vq and vd and the rotation angle of the electric motor 15.

That is, the q-axis voltage command value vq and the d-axis voltage command value vd are input to the coordinate transformer 17 having a function of transformation from two phases to three phases, and the coordinate transformer 17 converts, based on the rotation angle θ, the values vq and vd into voltage command values va*, vb*, and vc* which are respective voltage command values of the three phases. The voltage command values va*, vb*, and vc* thus converted are input to the PWM signal generator 21. The PWM signal generator 21 generates drive signals (PWM signals) for the electric motor 15 based on the current command values.

Figure 2:
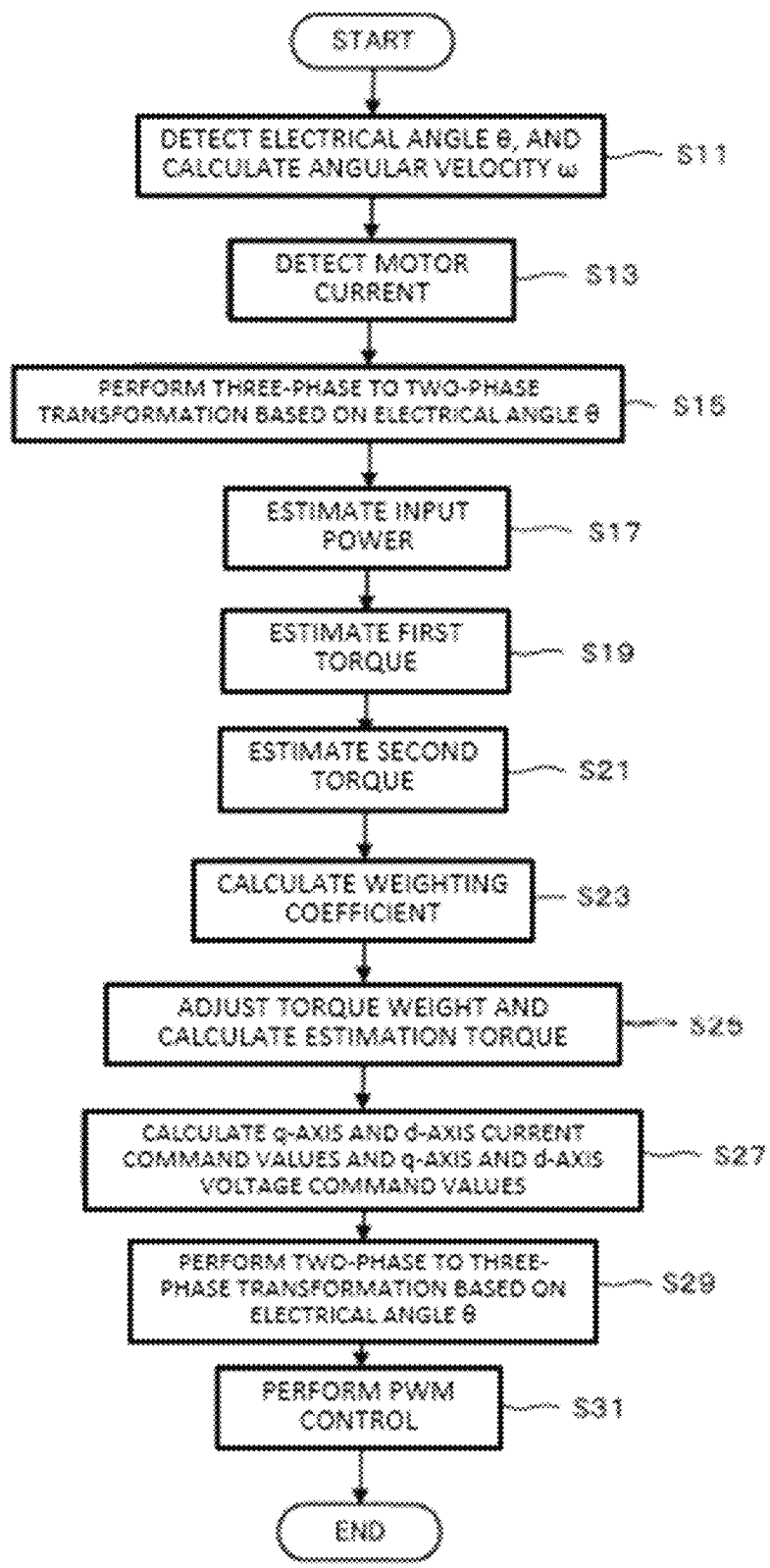
FIG. 2 is a flowchart illustrating drive and control (operation examples) of an electric motor by a motor control device according to an example embodiment of the present disclosure.

A description will now be given of a method for driving and controlling the electric motor by the motor control device according to the present example embodiment. FIG. 2 is a flowchart illustrating drive and control (operation examples) of the electric motor by the motor control device according to the present example embodiment.

In step S11 of FIG. 2, an angular velocity co of the electric motor 15 is calculated based on an electrical angle (rotation angle) θ detected by the rotation angle sensor 29. In step S13, the motor current is detected. Here, as described above, the current detection signals from the current detector 25 are subjected to the A/D conversion in the ADC 27 to obtain the three-phase currents $i_a$, $i_b$, and $i_c$ as digital values.

In step 15, three-phase to two-phase transformation and rotating coordinate transformation are performed in the coordinate transformer 28 to calculate a current $i_d$ on a d-axis and a current $i_q$ on a q-axis (which are feedback currents) based on the rotation angle θ detected in step S11 and the three-phase currents $i_a$, $i_b$, and $i_c$ obtained in step S13.

In step S17, the input power estimator 31 estimates the motor input power P using Expression (6) above. In subsequent step S19, the first torque estimator 33 calculates the first torque estimation value $T_1$ according to Expression (4) above. In step S21, the second torque estimator 35 calculates the second torque estimation value $T_2$ using Expression (5) above.

That is, in step S19, the first torque estimation value is determined based on the coil interlinkage flux, the motor current, and the like, and in step S21, the second torque estimation value is determined based on the motor input power, the motor rotational speed, and the like.

In step S23, the coefficient calculator 38 calculates the weighting adjustment coefficient α. The coefficient calculator 38 calculates the weighting adjustment coefficient α using any one of the above-described first to third methods. Here, for example, any one of the first to third methods may be fixed for use, or may be appropriately selected based on, for example, a driving state of the electric motor 15.

In step S25, according to Expression (3) above, using the weighting adjustment coefficient α calculated in step S23, the torque weight adjuster 37 adjusts the torque weights respectively applied to the first torque estimation value $T_1$ obtained in step S19 and the second torque estimation value $T_2$ obtained in step S21, and the torque weight adjuster 37 calculates the torque estimation value $\hat{T}$ (T hat).

In the torque weight adjustment in step S25, for example, when the coefficient shown in Expression (9) above is used as the weighting adjustment coefficient α, the proportion of the torque estimation value $T_2$ according to the energy method is increased in the torque estimation value $\hat{T}$ (T hat) obtained in Expression (3) as the motor output increases. As a result, a torque estimation error can be reduced, which is caused by magnetic saturation in a high-output region of the motor.

When the coefficient shown in Expression (8) above or Expression (9) above is used as the weighting adjustment coefficient α, in the calculation of the torque estimation value according to Expression (3), the motor rotational speed corn can be eliminated by multiplication, division using the motor rotational speed can be avoided to simplify the calculation, and the torque estimation can be performed in the entire region.

In step S27, q-axis and d-axis current command values and q-axis and d-axis voltage command values are calculated. Specifically, in the current command value calculator 12, current command calculation is performed based on a difference between the instruction torque Tq and the torque estimation value $\hat{T}$ (T hat) to calculate q-axis and d-axis current command values.

After the d-axis and q-axis command currents are calculated, PI control is performed on a difference between the q-axis command current $iq_{ref}$ and the q-axis current iq to calculate a q-axis voltage command value vq which is a command value of the q-axis voltage. Furthermore, PI control is performed on a difference between the d-axis command current $id_{ref}$ and the d-axis current id to calculate a d-axis voltage command value vd which is a command value of the d-axis voltage.

In step S29, the coordinate transformer 17 performs two-phase to three-phase transformation to determine voltage command values va*, vb*, and vc* which are respective voltage command values of the three phases, based on the q-axis voltage command value vq and the d-axis voltage command value vd which have been calculated in step S27, and the rotation angle θ.

In step S31, the respective voltage command values va*, vb*, and vc* of the three phases determined in step S29 are input to the PWM signal generator 21. The PWM signal generator 21 generates drive signals (PWM signals) for the electric motor 15 based on the current command values.

Figure 3:
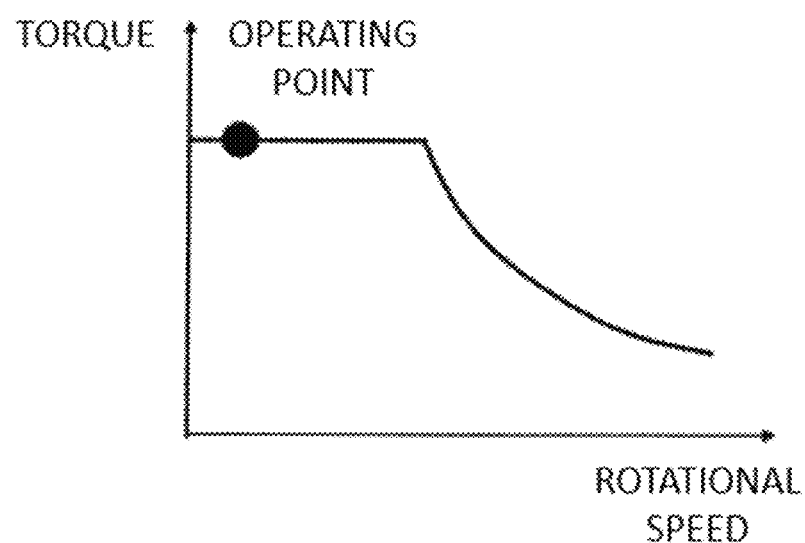
FIG. 3 is a diagram illustrating an operating point based on a torque weight adjustment effect according to an example embodiment of the present disclosure.
Figure 4:
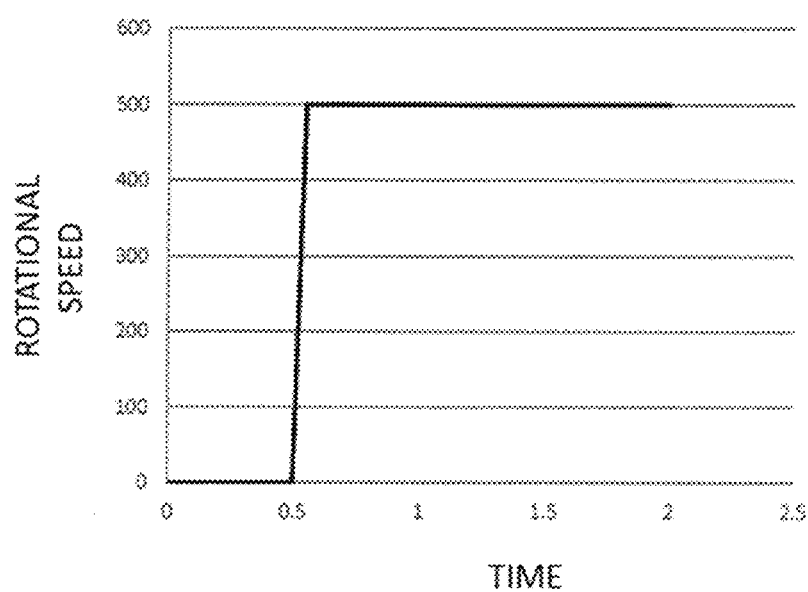
FIG. 4 is a diagram illustrating acceleration and rotation states of the electric motor, to confirm the torque weight adjustment effect.

A description will now be given of a torque weight adjustment effect in the motor control device according to the present example embodiment. FIG. 3 illustrates an operating point based on the torque weight adjustment effect. Here, as illustrated in FIG. 4, it is assumed that the electric motor accelerates from a stopped state and rotates at a constant rotational speed of 500 rpm.

Figure 5:
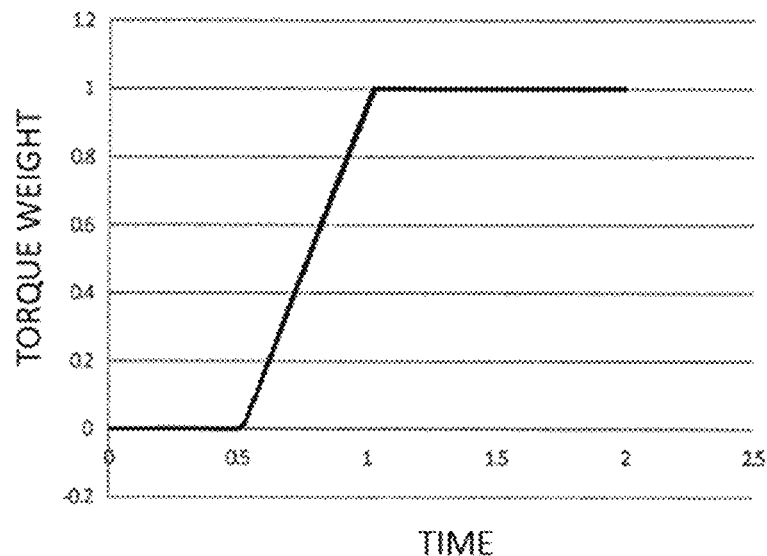
FIG. 5 is a diagram illustrating an adjusted torque weight according to an example embodiment of the present disclosure.

FIG. 5 illustrates an adjusted torque weight. The torque weight in FIG. 5 is an example of weighting using the weighting coefficient α calculated according to Expression (8) above.

Figure 6:
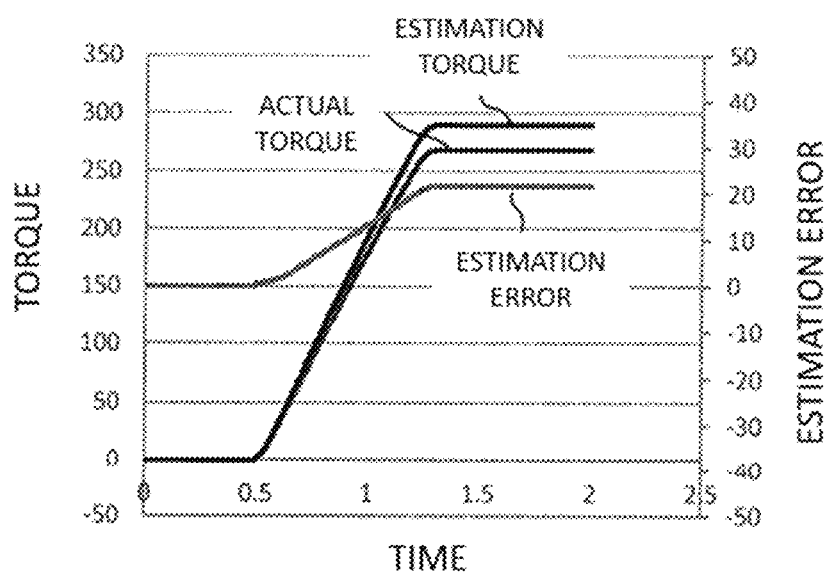
FIG. 6 is a diagram illustrating a result of a conventional torque estimation according to a cross product method.

Then, the torque weight adjustment effect will be described by comparing the conventional torque weight adjustment with the torque weight adjustment in the motor control device according to the present example embodiment. FIG. 6 illustrates a result of a conventional example in which torque is estimated according to the above-described cross product method, and FIG. 7 illustrates a result of a conventional example in which torque is estimated according to the energy method.

Figure 8:
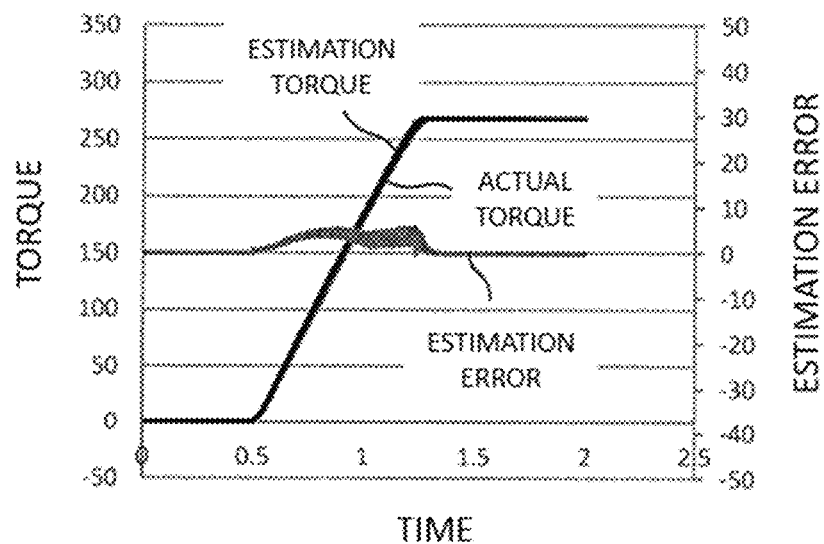
FIG. 8 is a diagram illustrating a result of a torque estimation in a motor control device according to the present example embodiment.

Meanwhile, FIG. 8 illustrates a result of a torque estimation in the motor control device according to the present example embodiment. As can be seen from comparison between FIG. 6 and FIG. 8, a torque estimation error is greatly smaller in the torque estimation in the motor control device according to the present example embodiment than in the conventional torque estimation according to the cross product method.

Figure 7:
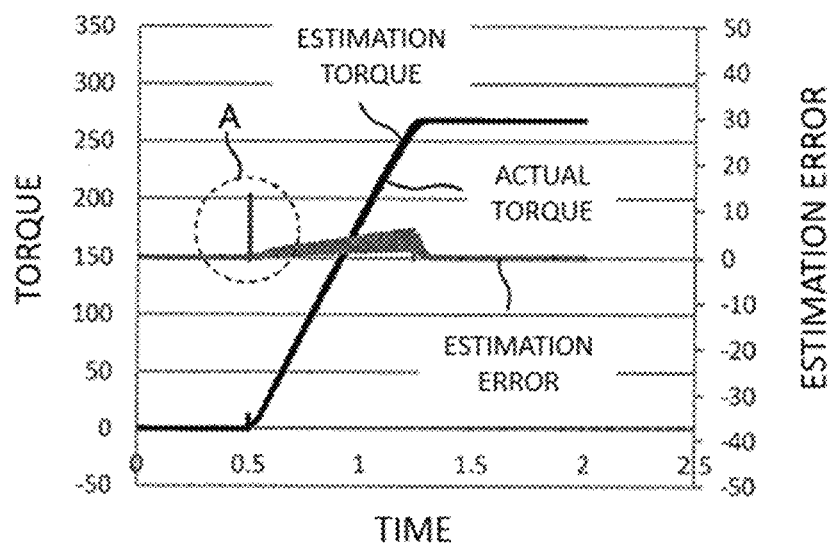
FIG. 7 is a diagram illustrating a result of a conventional torque estimation according to an energy method.

As can be seen from comparison between FIG. 7 and FIG. 8, a torque estimation error at zero speed (0.5 sec) is smaller in the torque estimation in the motor control device according to the present example embodiment than in the conventional torque estimation according to the energy method.

The reason therefor is as follows. In the conventional torque estimation according to the energy method illustrated in FIG. 7, the estimation error rapidly increases when the motor starts to rotate (at substantially zero speed) as indicated by a sign A, and the torque estimation becomes unstable. In the case of the torque estimation in the motor control device according to the present example embodiment, the estimation error does not occur even when the motor starts to rotate as illustrated in FIG. 8.

The motor control device according to the present example embodiment can be mounted on, for example, an electric pump, home electrical appliances, various industrial devices, an electric power steering device, and the like. For example, when the motor control device according to the present example embodiment is mounted on an electric power steering device, a torque estimation error is reduced in motor drive and control by the motor control device, and a steering torque during steering assistance can be accurately estimated. At the same time, the torque generated from the electric motor assists rotation of a rotation shaft connected to a steering wheel, thereby assisting a driver in steering.

Furthermore, the electric power steering device can be mounted on an electric power steering system. Even in this case, the torque estimation error is reduced in the motor drive and control by the motor control device, and the steering torque can be accurately estimated during steering assistance of the electric power steering system.

In addition, the motor control device according to the present example embodiment can be mounted on a vehicle, such as an electric vehicle (EV) and a hybrid vehicle, using an electric motor as a drive source. In this case, it is possible to reduce the torque estimation error of the electric motor serving as a power source during both low-speed traveling and high-speed traveling of the vehicle.

As described above, in the motor control device according to the present example embodiment, the weightings are adjusted using the weighting coefficient α calculated in accordance with the predetermined condition, the weightings being respectively applied to the two types of torque estimation values: the first torque estimation value estimated according to the cross product method in the first torque estimator; and the second torque estimation value estimated according to the energy method in the second torque estimator.

With the combined use of such two different types of torque estimation methods, the weightings respectively applied to the calculated torque estimation values are adjusted, and therefore, a more accurate motor torque estimation value can be determined in both operation regions of a low-output region and a high-output region of the electric motor.

As a result, in the motor control device, for example, a torque estimation utilizing the features of the cross product method is performed in driving the motor at low output (at a low speed), and a torque estimation utilizing the features of the energy method is performed in driving the motor at high output (at a high speed), and therefore, the torque estimation can be performed utilizing the features of each of the cross product method and the energy method.

Thus, in the motor control device, the inverter circuit is controlled using the current command values calculated based on the torque estimation values and the pulse width modulation (PWM) signals generated based on the voltage command values, and therefore, inverter control of the electric motor can be performed using the torque estimation values with increased accuracy in estimation.

Features of the above-described preferred example embodiments and the modifications thereof may be combined appropriately as long as no conflict arises.

Additionally, a part or whole of the motor control device 1 and/or the functional units or blocks thereof as described above with respect to the various preferred embodiments of the present invention be implemented in one or more circuits or circuitry, such as an integrated circuit(s) or as an LSI (large scale integration). Each functional unit or block of the motor control device 1 may be individually made into an integrated circuit chip. Alternatively, part or whole of the functional units or blocks may be integrated and made into an integrated circuit chip. Additionally, the method of forming a circuit or circuitry defining the motor control device 1 is not limited to LSI, and an integrated circuit may be implemented by a dedicated circuit or a general-purpose processor or controller that is specifically programmed to define a special-purpose processor or controller. Further, if technology of forming an integrated circuit, which replaces LSI, arises as a result of advances in semiconductor technology, an integrated circuit formed by that technology may be used.

Furthermore, a program which is operated in the motor control device 1 and/or other elements of various preferred embodiments of the present invention, is a program (program causing a computer to perform a function or functions) controlling a CPU, Control Unit, Controller, Control Circuit, Processor, Microprocessor, Processor Circuit, etc. in order to realize functions of the various preferred embodiments according to the present invention, including each of the various circuits or circuitry described herein and recited in the claims. Therefore, information which is handled by the motor control device 1 is temporarily accumulated in a RAM at the time of the processing. Thereafter, the information is stored in various types of circuitry in the form of ROMs and HDDs, and is read out by circuitry within, or included in combination with, the motor control device 1 as necessary, and modification or write-in is performed thereto. As a recording medium storing the program, any one of a semiconductor medium (for example, the ROM, a nonvolatile memory card or the like), an optical recording medium (for example, a DVD, an MO, an MD, a CD, a BD or the like), and a magnetic recording medium (for example, a magnetic tape, a flexible disc or the like) may be used. Moreover, by executing the loaded program, the functions of the various preferred embodiments of the present invention are not only realized, but the functions of preferred embodiments of the present invention may be realized by processing the loaded program in combination with an operating system or other application programs, based on an instruction of the program.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor control device to drive an electric motor, the motor control device comprising:
   a first torque estimator to determine a first torque estimation value based on at least a coil interlinkage flux and a motor current;
   a second torque estimator to determine a second torque estimation value based on at least a motor input power and a motor rotational speed; and
   a weighting adjuster to adjust weightings respectively applied to the first torque estimation value and the second torque estimation value in accordance with a predetermined condition, and to calculate a torque estimation value of the electric motor.

2. The motor control device according to claim 1, wherein the weighting adjuster calculates a torque estimation value $\hat{T}$ of the electric motor according to:

$$\hat{T} = (1-\alpha)T_1 + \alpha T_2 \qquad (1)$$

where, $T_1$ represents the first torque estimation value, $T_2$ represents the second torque estimation value, and $\alpha(0 \leq \alpha \leq 1)$ represents a weighting coefficient of the weighting adjustment; and
$T_1 = N_{pp}\{(\phi i_q + (L_d - L_q)i_d i_q\}$, where $N_{pp}$ represents a number of motor pole pairs, $L_d$ and $L_q$ represent motor inductances in a rotation vector coordinate system, $\phi$ represents the coil interlinkage flux, and $i_d$ and $i_q$ represent the motor currents, and $T_2=P/\omega_m$, where P represents the motor input power, and $\omega_m$ represents the motor rotational speed.

3. The motor control device according to claim 2, wherein the weighting adjuster is operable to adjust the weighting coefficient α based on an output of the electric motor as the predetermined condition.

4. The motor control device according to claim 2, wherein the weighting adjuster is operable to adjust the weighting coefficient α based on a rotational speed of the electric motor as the predetermined condition.

5. The motor control device according to claim 2, wherein the weighting adjuster is operable to adjust the weighting coefficient α based on a current flowing through a coil of the electric motor as the predetermined condition.

6. The motor control device according to claim 2, further comprising an input power estimator to estimate the motor input power P using:

$$P=v_d i_d + v_q i_q - P_c - P_i \qquad (2)$$

where, $v_d$ and $v_q$ represent voltages applied to the motor in the rotation vector coordinate system, $P_c$ represents a copper loss, and $P_i$ represents a loss other than the copper loss.

7. The motor control device according to claim 6, further comprising a copper loss estimator to estimate the copper loss $P_c$ using:

$$P_c=R(i_d^2+i_q^2) \qquad (3)$$

where, R represents a coil resistance value of the electric motor.

8. The motor control device according to claim 7, further comprising:
a detector to detect a coil temperature of the electric motor; and
a corrector to correct the coil resistance value using the coil temperature.

9. The motor control device according to claim 1, further comprising:
a detector to detect a magnet temperature of a magnet provided in a rotor of the electric motor; and
a corrector to correct a coil interlinkage flux of the electric motor using the magnet temperature.

10. The motor control device according to claim 1, further comprising:
a current command value calculator to calculate a current command value based on the torque estimation value of the electric motor and a predetermined torque command value;
a pulse width modulation (PWM) signal generator configured to generate a predetermined PWM signal based on the current command value; and
an inverter controller configured or programmed to drive and control the electric motor using the PWM signal.

11. A motor control device of an electric power steering to assist a driver in steering a vehicle or the like, the motor control device comprising:
an electric motor to provide steering assistance to the driver; and
a driver to drive and control the electric motor by the motor control device according to claim 1.

12. An electric power steering system comprising the motor control device of the electric power steering according to claim 11.

13. An electric vehicle including an electric motor as a power source, the electric vehicle comprising:
a driver to drive and control the electric motor by the motor control device according to claim 1.

14. A hybrid vehicle including an electric motor and an internal combustion engine as power sources, the hybrid vehicle comprising:
a driver to drive and control the electric motor by the motor control device according to claim 1.

15. A motor control method for driving an electric motor, the motor control method comprising:
determining a first torque estimation value based on at least a coil interlinkage flux and a motor current;
determining a second torque estimation value based on at least motor input power and a motor rotational speed; and
adjusting weightings respectively applied to the first torque estimation value and the second torque estimation value in accordance with a predetermined condition, and calculating a torque estimation value of the electric motor.

16. The motor control method according to claim 15, wherein
the adjusting weightings includes calculating a torque estimation value $\hat{T}$ of the electric motor according to:

$$\hat{T}=(1-\alpha)T_1+\alpha T_2 \qquad (1)$$

where $T_1$ represents the first torque estimation value, $T_2$ represents the second torque estimation value, and $\alpha(0\leq\alpha\leq1)$ represents a weighting coefficient of the weighting adjustment; and
where, $T_1=N_{pp}\{\phi i_q+(L_d-L_q)i_d i_q\}$, where $N_{pp}$ represents a number of motor pole pairs, $L_d$ and $L_q$ represent motor inductances in a rotation vector coordinate system, $\phi$ represents the coil interlinkage flux, and $i_d$ and $i_q$ represent the motor currents, and $T_2=P/\omega_m$, where P represents the motor input power, and $\omega_m$ represents the motor rotational speed.

* * * * *